United States Patent
Kampel et al.

(10) Patent No.: US 11,790,642 B2
(45) Date of Patent: Oct. 17, 2023

(54) METHOD FOR DETERMINING A TYPE AND A STATE OF AN OBJECT OF INTEREST

(71) Applicants: CogVis Software und Consulting GmbH, Vienna (AT); Toyota Motor Europe NV/SA, Brussels (BE)

(72) Inventors: Martin Kampel, Vienna (AT); Christopher Pramerdorfer, Vienna (AT); Rainer Planinc, Vienna (AT); Michael Brandstoetter, Vienna (AT); Mark Van Loock, Westmeerbeek (BE)

(73) Assignees: CogVis Software und Consulting GmbH, Vienna (AT); Toyota Motor Europe NV/SA, Brussels (BE)

( * ) Notice: Subject to any disclaimer, the term of this patent is extended or adjusted under 35 U.S.C. 154(b) by 395 days.

(21) Appl. No.: 17/057,459

(22) PCT Filed: Apr. 5, 2019

(86) PCT No.: PCT/EP2019/058660
§ 371 (c)(1),
(2) Date: Nov. 20, 2020

(87) PCT Pub. No.: WO2019/233654
PCT Pub. Date: Dec. 12, 2019

(65) Prior Publication Data
US 2021/0142091 A1    May 13, 2021

(30) Foreign Application Priority Data
Jun. 4, 2018   (EP) .................................... 18175783

(51) Int. Cl.
*G06V 10/82* (2022.01)
*G06T 7/55* (2017.01)
(Continued)

(52) U.S. Cl.
CPC ............... *G06V 10/82* (2022.01); *G06N 3/04* (2013.01); *G06N 3/08* (2013.01); *G06T 7/55* (2017.01);
(Continued)

(58) Field of Classification Search
None
See application file for complete search history.

(56) References Cited

U.S. PATENT DOCUMENTS 9,355,334 B1 * 5/2016 Martinson ............ G06V 40/103
2018/0012078 A1 * 1/2018 Pournaghi ................. G06T 7/77
(Continued)

OTHER PUBLICATIONS

International Preliminary Report on Patentability in corresponding International Application No. PCT/EP2019/058660, dated Dec. 8, 2020.
(Continued)

*Primary Examiner* — Leon Flores
(74) *Attorney, Agent, or Firm* — Hoffmann & Baron, LLP

(57) ABSTRACT

The disclosed subject matter relates to a method for determining a type and a state of an object of interest, comprising: generating a depth map of a scene by means of a depth sensor, the scene containing the object of interest and an occlusion object lying between the depth sensor and the object of interest; computing three 2D occupancy views,
(Continued)

each in a different viewing direction, and three 2D occlusion views; feeding each of said occupancy and occlusion views into a different input of a trained convolutional neural network; receiving both a class and a bounding box of the object of interest from the convolutional neural network; and determining the type of the object of interest and the state of the object of interest.

The disclosed subject matter further relates to a system for carrying out said method.

16 Claims, 3 Drawing Sheets

(51) Int. Cl.
```
G06N 3/04      (2023.01)
G06N 3/08      (2023.01)
G06V 20/40     (2022.01)
G06V 20/64     (2022.01)
G06V 10/764    (2022.01)
G06V 20/52     (2022.01)
```
(52) U.S. Cl.
CPC ............ *G06V 10/764* (2022.01); *G06V 20/40* (2022.01); *G06V 20/52* (2022.01); *G06V 20/64* (2022.01); *G06V 20/44* (2022.01)

(56) References Cited

U.S. PATENT DOCUMENTS

| | | | | |
|---|---|---|---|---|
| 2018/0278918 | A1* | 9/2018 | Peri | H04N 13/106 |
| 2019/0362511 | A1* | 11/2019 | Jouppi | G06T 5/50 |
| 2020/0074679 | A1* | 3/2020 | Masui | G06T 7/50 |

OTHER PUBLICATIONS

Kanezaki, Asako, et al., "RotationNet: Joint Object Categorization and Pose Estimation Using Multiviews from Unsupervised Viewpoints," Proceedings of the IEEE Conference on Computer Vision and Pattern Recognition. 2018.

Qi, Charles R., et al. "Volumetric and Multi-View CNNs for Object Classification on 3D Data," Proceedings of the IEEE Conference on Computer Vision and Pattern Recognition, 2016.

Su, Hang, et al. "Multi-View Convolutional Neural Networks for 3D Shape Recognition," Proceedings of the IEEE International Conference on Computer Vision 2015.

Wu, Zhirong, et al. "3D ShapeNets: a Deep Representation for Volumetric Shapes,"Proceedings of the IEEE Conference on Computer Vision and Pattern Recognition, 2015.

European Search Report for Application 18175783.2-1207, dated Jul. 27, 2018.

Written Opinion of the International Searching Authority and International Search Report for International Application No. PCT/EP2019/058660, dated May, 6, 2019.

* cited by examiner

METHOD FOR DETERMINING A TYPE AND A STATE OF AN OBJECT OF INTEREST

The present invention relates to a method for determining a type and a state of an object of interest. The invention further relates to a system for determining a type and a state of an object of interest.

Various techniques exist for automated detection of objects such as people and can be used in many fields in the state of the art. For example, fall detection is an active field of research as it has many applications for real-life situations. E.g., in old people's homes sensors can be in-stalled in every room that observe the motion and state of residents when no supervision is present. These devices can detect if the observed person falls over and set off an alarm to a central station in such a case.

For such a system, usually depth sensors are employed that record 3D depth maps at regular intervals. At the out-set, an object of interest is detected in the depth maps by ordinary means, e.g., by background subtraction. Then, each depth map is evaluated with regard to two aspects: Firstly, whether or not a person is depicted in the depth map, i.e., the type of the object of interest, and secondly whether or not said person has fallen over, i.e., the state of the object of interest. The evaluation is usually performed by means of feeding the three-dimensional (3D) depth map into a trained convolutional neural network, which is capable of extracting information about a person located within said 3D depth map.

Due to the high amount of information in 3D depth maps, the above-described devices have turned out to be very inefficient as it is difficult for neural networks to extract information therefrom. As such, it has been proposed to determine two-dimensional (2D) views within a neural network, see for example C. R. Qi et al., "Volumetric and Multi-View CNNs for Object Classification on 3D Data" in IEEE Conference in Computer Vision and Pattern Recognition, 2016, pp. 5648-5656. In this way, success rates of detecting people and their states were increased but problems still arose when the object of interest was occluded by other objects in the room.

In an alternative approach, in H. Su et al., "Multi-View Convolutional Neural Networks for 3D Shape Recognition" in International Conference on Computer Vision, 2015, pp. 945-953, it was proposed to compute twelve different projective greyscale images by rotating a virtual camera around 3D shape objects. However, this method produces aliasing arte-facts and employs a very inefficient early-fusion approach.

It is therefore an object of the invention to provide a method for determining a type and a state of an object of interest with a higher efficiency and a greater accuracy when the object is occluded by a different object between the object of interest and the depth sensor.

To this end, in a first aspect the invention provides for a method determining a type and a state of an object of interest, comprising: generating a depth map of a scene by means of a depth sensor, the scene containing the object of interest and an occlusion object lying between the depth sensor and the object of interest such that, seen from the depth sensor, a first part of the object of interest is occluded and a second part of the object of interest is not occluded; from the depth map, computing three 2D occupancy views, each in a different viewing direction, and three 2D occlusion views, each in a direction corresponding to a different one of said viewing directions, wherein the occlusion views each depict the occlusion object and the occupancy views each depict the second part of the object of interest with-out said occlusion object; feeding each of said occupancy and occlusion views into a different input of a trained convolutional neural network; receiving both a class and a bounding box of the object of interest from the convolutional neural network; and determining the type of the object of interest from the received class, and the state of the object of interest from the bounding box.

The invention is based on the findings of the inventors that the shape and size of the object (the so-called "occlusion object") that occludes the object of interest is invaluable information for the convolutional neural network to determine the class and the bounding box. The bounding box of the object of interest can be more accurately determined when the extent of the occlusion object is also provided to the convolutional neural network as this sets limitations (for example in height and width) and thus helps to find an appropriate bounding box. Therefore, the information about the occlusion object even helps in determining the type of the object of interest.

For a more efficient and accurate evaluation of the class and bounding box, the occupancy and occlusion views are input at parallel, i.e., different, inputs of the convolutional neural network. This helps the convolutional neural network to process the information of the occupancy views with support of the occlusion views, which naturally contain less information stored about the object of interest than the occupancy views themselves.

The bounding box comprises parts of the object of interest that are not visible in the depth map. Furthermore, the occlusion object can be one element or a composition of multiple elements of the scene.

Preferably, the convolutional neural network comprises a frontend for generating feature maps from the occlusion and occupancy views, a middle section for generating class predictions and bounding box predictions from said feature maps, and an averaging section for generating the class and the bounding box by averaging the class predictions and bounding box predictions, respectively. Each bounding box prediction is a 2D prediction of the bounding box in the respective viewing direction and gives rise to information about the bounding box. From these multiple 2D bounding box predictions, the averaging section generates the 3D bounding box. During development of the present method, it has been found that three-staged convolutional neural networks, having a front end, a middle section, and an averaging section, are especially efficient in handling the input of different types of views, i.e., the occupancy views on the one hand and the occlusion views on the other hand. In this embodiment, the feature maps, class predictions, and bounding box predictions are intermediate products for each viewing direction that are generated and used within the convolutional neural network only.

Further preferably, the frontend comprises three frontend groups of layers, one for each viewing direction, each group generating feature maps. Each frontend group of layers serves to handle the occupancy view of one viewing direction as well as the occlusion view of the same viewing direction. This serves to process the occupancy and occlusion views simultaneously within each frontend group such that connections and/or relations can be maintained that exist between the occupancy view and the respective occlusion view.

In this embodiment it is especially preferred when each frontend group consists of a first predetermined number of layers for the occupancy view and a second predetermined number of layers for the occlusion view, wherein the number of layers for the occupancy views is higher than the number of layers for the occlusion views. As such, each frontend group comprises a first branch of layers for the occupancy view and a second branch of layers for the occlusion view. This is advantageous because it has been found that—due to the different information context of occupancy and occlusion views—the occlusion views need less processing than the occupancy views. Furthermore, the parallel processing of the occupancy and occlusion views within each group helps to keep the information separate until the final output of the frontend groups is produced.

Further preferably, the layers for the occupancy views consist of both convolutional layers and max-pooling layers and the layers for the occlusion views only consist of max-pooling layers. The max-pooling layers (for carrying out max-pooling operations) serve to reduce the dimensionality of the image of view while preserving occlusion (or occupancy) information. As the first branch of the occupancy view and the second branch of the occlusion view comprise the same number of max-pooling operations, the outputs of both branches are feature maps of the same size. The feature maps of both branches are, at the output/s of the frontend, both concatenated to output one set of feature maps for each group of the frontend. In contrast to the max-pooling layers, the convolutional layers used for the occupancy views are layers that perform non-linear operations. Dense layers, which usually perform linear operations of the input, are not used in the frontend.

Similarly to the frontend, preferably also the middle section comprises three middle section groups of layers, one for each viewing direction. This serves to keep the information obtained from each viewing direction separated. This has shown to yield efficient and accurate results of the computed class and bounding box in practice.

Further preferably, in this embodiment each middle section group comprises three dense layers, of which a first-stage dense layer receives the feature maps from the frontend and of which two parallel second-stage dense layers receive an output of the first-stage dense layer, wherein one of the second-stage dense layers outputs the class predictions and the other one of the second-stage dense layers outputs the bounding box predictions. This special setup of the middle section has been found to yield exceptional results in terms of accuracy and efficiency. The common first-stage dense layer forces the neural network to learn features that are discriminative for both the class and bounding box of the object of interest, while enabling the net-work to exploit symmetries between both tasks of computing class predictions and bounding box predictions. The individual second-stage dense layers after the common first-stage dense layer serve to optimize the computation of class pre-dictions and bounding box predictions, respectively.

The above-mentioned method for determining a type and a state of object of interest can be used in many different practical scenarios, most commonly for detecting illness or misbehavior of people and/or animals. However, it is especially preferred when the method is used for determining the fall of a person. This is done by performing the aforementioned method in any of the aforementioned embodiments, wherein the type of the object of interest corresponds to a person and the state of the object of interest corresponds to a fall. This application is especially preferred as the fall of a person can very accurately be determined from the properties of the bounding box.

In a second aspect of the invention, there is provided a system for carrying out said method. This system has the same advantages and preferred embodiments as said method.

The invention shall now be explained in more detail be-low on the basis of preferred exemplary embodiments thereof with reference to the accompanying drawings, in which:

FIG. 1 shows a system according to the present invention for determining a type and state of an object of interest, which is partly occluded in a depth map;

FIGS. 2a, 2b and 2c each show an occupancy view computed from a depth map in a different viewing direction;

FIGS. 3a, 3b and 3c each show an occlusion view computed from a depth map in a different viewing direction;

Figure 1:
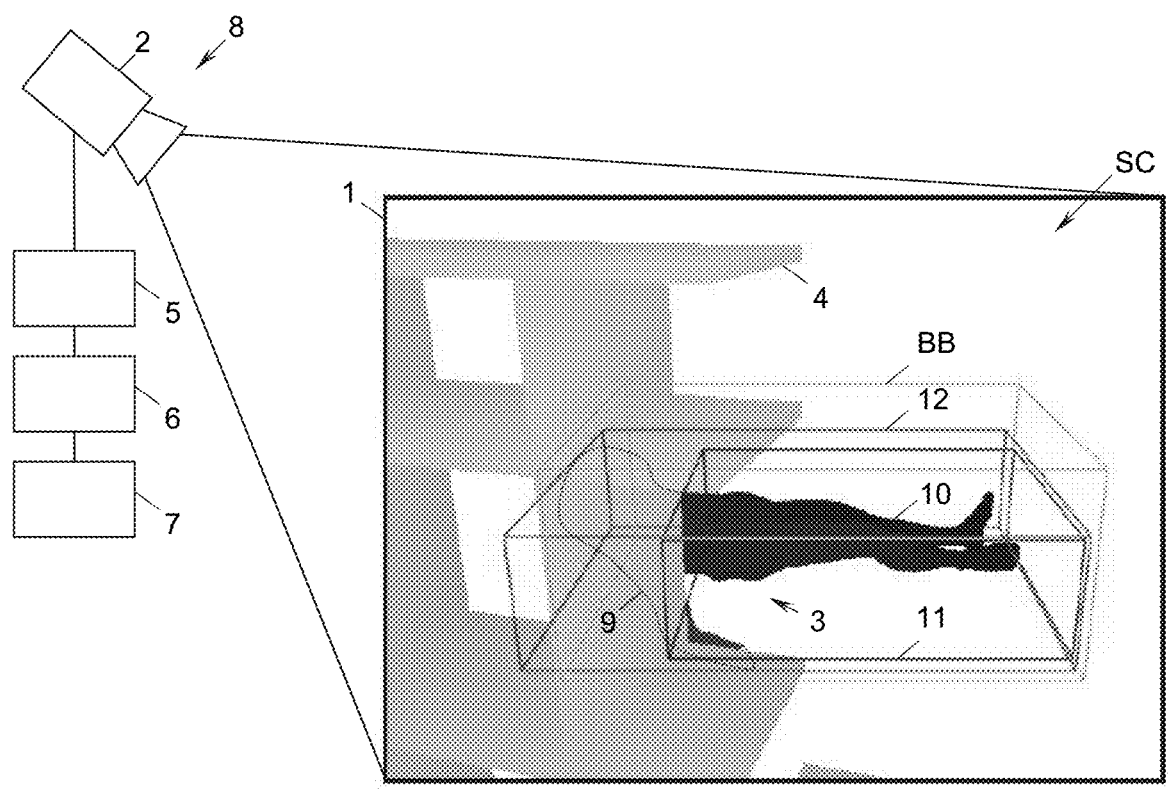

FIG. 1 shows a perspective view of a depth map 1 generated by a depth sensor 2. The depth map 1 depicts a scene SC containing an object of interest 3, in this case a person. Between the depth sensor 2 and the object of interest 3 lies an occlusion object 4, here a shelf. The depth sensor 2, together with a processor 5, a convolutional neural network 6, and an evaluation device 7, form a system 8 for determining a type TY and a state ST of the object of interest 3.

In the embodiment of FIG. 1, the system 8 is used to determine whether a person located within the scene SC has fallen over. In such a case, an alarm or a warning could be set off by the system 8 to call for help or a check-up. The system 8, however, could also be used for different applications such as determining whether animals located within the scene SC are lying or standing.

As the occlusion object 4 is located between the depth sensor 2 and the object of interest 3, a first part 9 of the object of interest 3 is occluded, as seen from the depth sensor 2, and a second part 10 of the object of interest 3 is not occluded, as seen from the depth sensor 2. In other words, the first part 9 is not visible in the depth map 1 and the second part 10 is visible therein.

The depth sensor 2 can be of any type known in the state of the art capable of generating the depth map 1, which is, for example, a 3D voxel grid or a point cloud. One example for such a depth sensor 1 is a Kinect® sensor, which emits a pattern of infrared light and generates the depth map 1 from the environment's reflection thereof. No additional grey scale or color images are necessary for the method described herein.

In order to determine the state ST of the object of interest 3, the system 8 computes a bounding box BB, i.e., a cuboid that should be as small as possible while still circumscribing the whole object of interest 3, i.e., both said first and second part 9, 10. As the first part 9 of the object of interest 3 is occluded in the depth map 1, the bounding box BB will be an estimate computed by the system 8. For reference, FIG. 1 also shows the smallest possible cuboid 11 around the visible second part 10 and the "real" (theoretical) smallest possible cuboid 12 around the actual object of interest 3, which cuboid 12 is not available to the system 8.

As can be seen from FIGS. 2a-2c, 3a-3c, and 4, after the depth sensor 2 has generated the depth map ("DM") 1 in a generation step 1', the processor 5 performs a label-ling step 13 of the depth map 1 such that the object of interest 3 and the occlusion object 4 can be represented in individual 3D maps or grids generated in steps 14 and 15, respectively. During the labelling step 13, for example a background subtraction can be performed to identify an object of interest 3 within the scene SC, i.e., an object that is not an inventory of the scene SC. For example, the depth sensor 2 can obtain a calibration depth map before any objects of interest are present in the scene SC and can be re-calibrated when necessary. Once the object of interest 3 has been identified ("labelled"), the part of the scene SC that is located between the depth sensor 2 and the object of interest 3 can be labelled as the occlusion object 4. As such, the occlusion object 4 can be composed of one or more elements that are located closer to the depth sensor 2 than the object of interest 3.

Figure 2A:
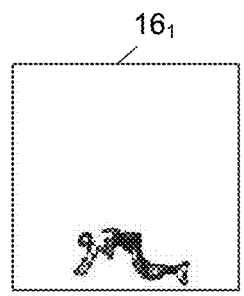
Figure 2B:
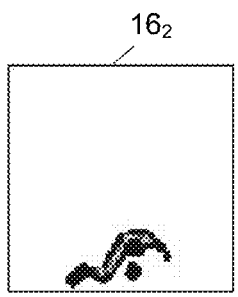
Figure 2C:
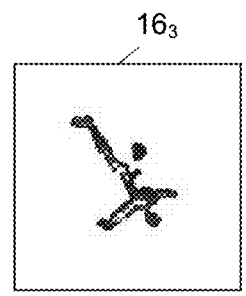
Figure 3A:
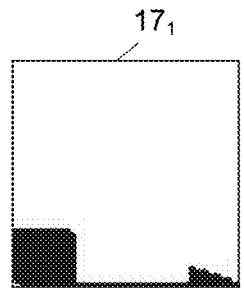
Figure 3B:
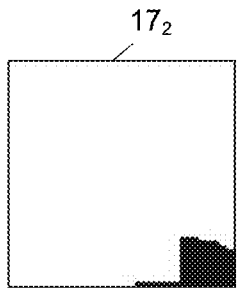
Figure 3C:
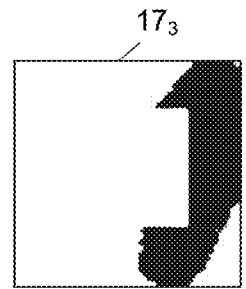
Figure 4:
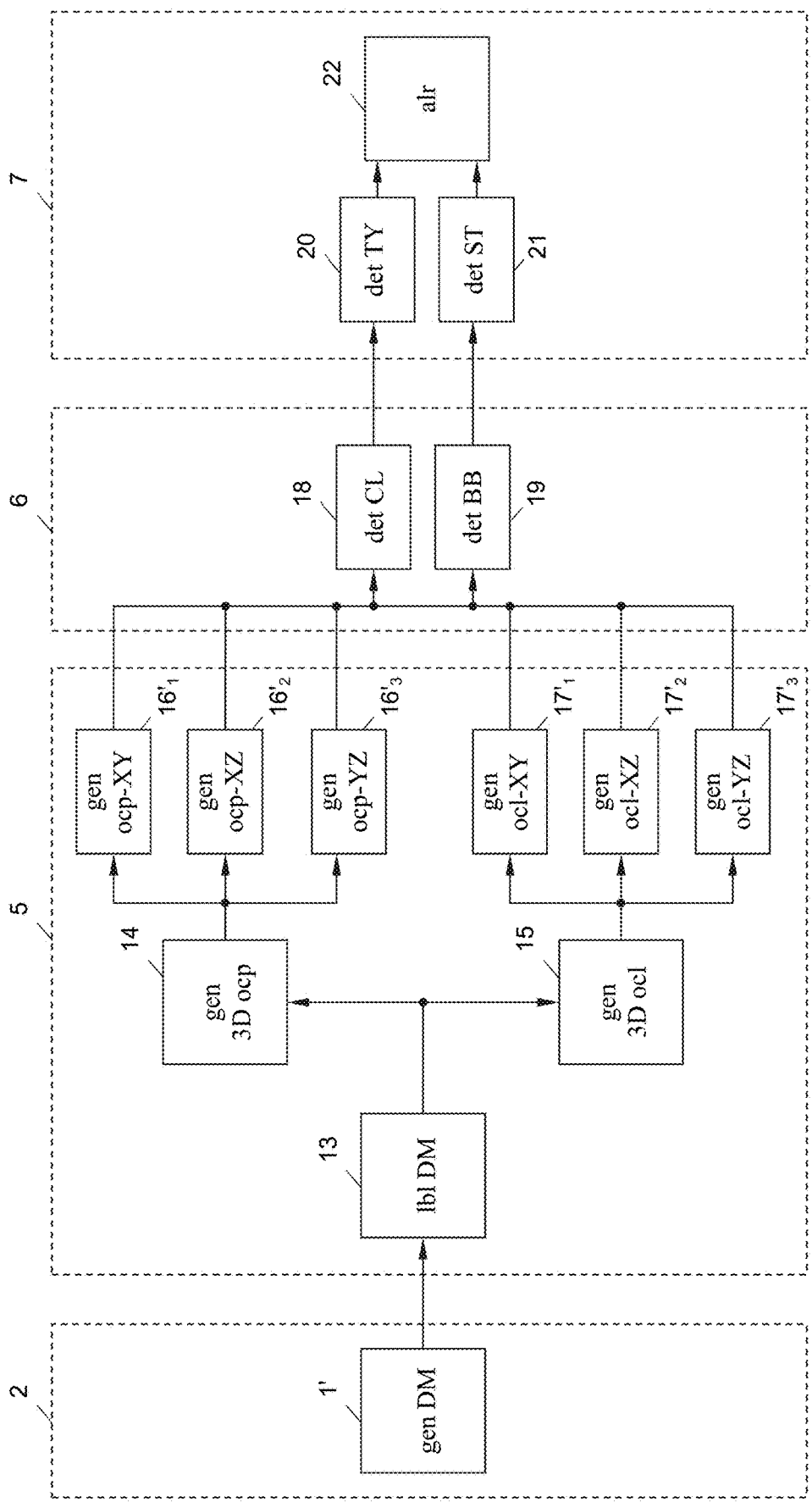
FIG. 4 shows the inventive method in a flow chart.

Once the object of interest 3 and the occlusion object 4 have been labelled in step 13, their labelled voxels can be represented in an individual map or grid to obtain an occupancy grid ("3D ocp") and an occlusion grid ("3D ocl"), respectively. From the 3D occupancy and occlusion grids, three 2D occupancy views ("ocp-XY", "ocp-XZ", "ocp-YZ") $16_1, 16_2, 16_3$ (examples of which are depicted in FIGS. 2a-2c) are computed in steps $16'_1, 16'_2, 16'_3$ by the processor 5, each in a different viewing direction, and three 2D occlusion views ("ocl-XY", "ocl-XZ", "ocl-YZ") $17_1, 17_2, 17_3$ (examples of which are depicted in FIGS. 3a-3c) are computed in steps $17'_1, 17'_2, 17'_3$ by the processor 5, each in a direction corresponding to a different one of said viewing directions. The different viewing directions are in most cases orthogonal, although the viewing directions could respectively enclose other angles, e.g., 60° angles.

The above-mentioned steps 14, 15 of generating the (intermediate) 3D grids or maps are, however, optional for the method described herein, such that the three 2D occupancy views $16_1, 16_2, 16_3$ and three 2D occlusion views $17_1, 17_2, 17_3$ could alternatively be computed directly from the depth map 1; step 13 could be performed in any way known, even manually.

As only the second part 10 of the object of interest 3 is visible in the depth map 1, also the three occupancy views $16_1, 16_2, 16_3$ each depict only the second part 10 of the object of interest 3 without said occlusion object 4. Similarly, the occlusion views $17_1, 17_2, 17_3$ each depict the occlusion object 4, preferably without the object of interest 3.

After the computation, the occupancy views $16_1, 16_2, 16_3$ and occlusion views $17_1, 17_2, 17_3$ are fed into the trained convolutional neural network 6. The convolutional neural network 6 comprises a number of neural layers as will be described in detail below with respect to FIG. 5. Due to those layers, the convolutional network 6 is able to determine a class CL and the bounding box BB of the object of interest 3 in steps 18 and 19. The convolutional neural network 6 out-puts the class CL and the bounding box BB to the evaluation device 7.

The evaluation device 7 then determines the type TY of the object of interest 3 from the received class CL in a step 20 and the state ST of the object of interest 3 from the bounding box BB in a step 21. This can be done, for ex-ample, by checking if the received class CL matches a predetermined type TY stored in a database and by evaluating the properties of the bounding box BB. For example, if the bounding box BB has a very flat shape, the state ST of the object can be considered as a fall. For the determination of the state ST, additionally to the currently computed bounding box BB, one or more previously computed bounding boxes BB can be used, e.g., to determine said state ST from a progression of bounding boxes BB.

In this specific example, a fall of a person is detected when the type TY of the object of interest 3 corresponds to a person and the state ST of the object of interest 3 corresponds to a fall. In such a case, an alarm can be set off in an optional step 22.

Figure 5:
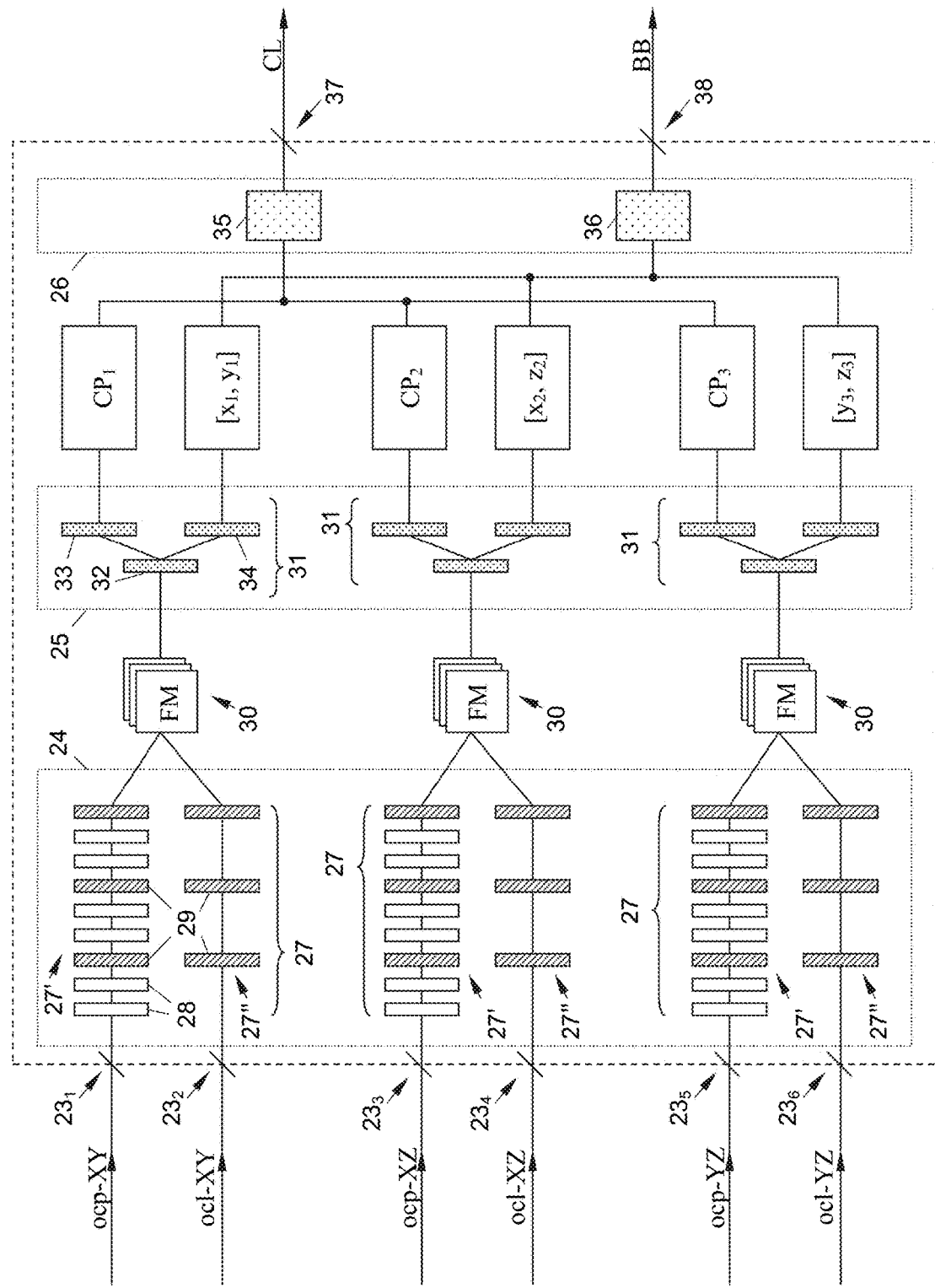
FIG. 5 shows a convolutional neural network used in the method of FIG. 4 in a schematic view.

Based on the example of FIG. 5, the convolutional neural network 6 is now described in detail. The convolutional neural network 6 has six inputs $23_1, 23_2, 23_3, 23_4, 23_5, 23_6$, each for receiving a different one of said occupancy and occlusion views $16_1, 16_2, 16_3, 17_1, 17_2, 17_3$. The convolutional neural network 6 comprises a frontend 24, a middle section 25, and an averaging section 26. The frontend 24 comprises three frontend groups 27, one for each viewing direction. Each group 27 comprises a first and a second branch 27', 27", the first branch 27' for the occupancy view $16_1, 16_2, 16_3$ and the second branch 27" for the occlusion view $17_1, 17_2, 17_3$ of the respective viewing direction. The first branch 27' of each frontend group 27 comprises a first predetermined number of layers 28, 29 and the second branch 27" comprises a second predetermined number of layers 29, wherein the number of layers 28, 29 within the first branch 27' is higher than the number of layers 29 within the second branch 27".

In the embodiment of FIG. 5, the first branch 27' of each group 27 comprises convolutional layers 28 and max-pooling layers 29 and the second branch 27" of each group 27 only consists of max-pooling layers 29. Convolutional layers 28 apply a convolutional operation to the input and max-pooling layers 29 reduce the dimensionality of their input without convolution, as known to the skilled person. The number of max-pooling layers in both branches 27', 27" is the same, such that the output of both branches 27', 27" of each group 27 are feature maps, as known in the art, which are of the same size or dimensionality. Each group 27 concatenates the feature maps of the first and second branch 27', 27" to achieve an output of feature maps 30. Thus, the output of the frontend 24 are feature maps 30, i.e., feature maps 30 for each viewing direction.

For example, the first branch 27' could comprise three max-pooling layers 29 and two (or one or more than two) convolutional layers 28 in front of each max-pooling layer 29. Also, a different number of convolutional layers 28 could be employed in front of each max-pooling layer 29, e.g., one convolutional layer 28 in front of the first max-pooling layer 29, two convolutional layers 28 in front of the second max-pooling layer 29, and so forth.

In the example of FIG. 5, the middle section 25 comprises three middle section groups 31, one for each viewing direction. Each middle section group 31 takes feature maps 30 as an input that were generated by the frontend group 27 of the same viewing direction. Each middle section group 31 generates a class prediction $CP_1, CP_2, CP_3$ and a 2D bounding box prediction $[x_1, y_1], [x_2, z_2], [y_3, z_3]$, wherein each middle section group 31 comprises three dense layers 32, 33, 34, of which a first-stage dense layer 32 receives the corresponding feature maps 30 from the frontend 24 and of which two parallel second-stage dense layers 33, 34 receive an output of the first-section dense layer 32. One of the second-stage dense layers 33 outputs the respective class pre-dictions $CP_1, CP_2$, or $CP_3$ and the other one of the second-stage dense layers 34 outputs the respective bounding box predictions $[x_1, y_1], [x_2, z_2]$, or $[y_3, z_3]$. The serial dense layer 32 applies a non-linear operation, whereas the parallel dense layers 33, 34 are output layers and apply a linear operation to the input, as known to the skilled person. In each of the embodiments, there can be more than one layer for each of the serial layer/s 32.

The averaging section 26 comprises a first and a second averaging module 35, 36. The first averaging module 35 takes all class predictions $CP_1$, $CP_2$, $CP_3$ as an input and computes therefrom the class CL, which it provides at an output 37 of the convolutional neural network 6. The second averaging module 36 takes all bounding box predictions $[x_1, y_1]$, $[x_2, z_2]$, $[y_3, z_3]$ as an input and computes therefrom the bounding box BB, which it provides at an output 38 of the convolutional neural network 6. The averaging modules 35, 36 could also employ weights between said predictions, e.g., if experiments show that the occupancy and occlusion view $16_3$, $17_3$ from the top are more important for the determination of class CL and bounding box BB, respectively.

As can be seen, the occlusion and occupation views $16_1$, $16_2$, $16_3$, $17_1$, $17_2$, $17_3$ are processed separately with respect to said viewing directions and only fused at the averaging section 26. Generally, the method thus employs a late-fusion approach, in which the occlusion and occupation views $16_1$, $16_2$, $16_3$, $17_1$, $17_2$, $17_3$ are only fused, with respect to the viewing directions, at the last stage of a multi-stage convolutional neural network 6, independent of the structure, type, or embodiment of the individual stages.

As described above, during operation of the method, the system 8 uses a trained convolutional neural network 6. The training of this convolutional neural network 6 is performed in the same way as the training of other neural networks in the state of the art, for example by feeding a set of occupancy and occlusion views $16_1$, $16_2$, $16_3$, $17_1$, $17_2$, $17_3$ (of which the "real" or theoretical smallest possible cuboid 12 is known) via the respective inputs $23_1$, $23_2$, $23_3$, $23_4$, $23_5$, $23_6$ into the convolutional neural network 6. The convolutional neural network 6 will then compute a bounding box BB for the input data, and an offset ("loss") can be determined by comparing the computed bounding box BB with the real cuboid 12 known in the training case.

The loss, i.e., the difference of bounding box BB to the real cuboid 12, can then be input as a feedback to the convolutional neural network 6 in a conventional manner for learning. The same training can be performed for the class CL, i.e., a loss is computed as the difference between the computed class CL and the actual class of the object of interest—this loss is usually binary—whereupon the loss is provided as a feedback to the convolutional neural network 6. Such training can optionally be conducted at a centralized convolutional neural network and the results thereof be copied to convolutional neural networks in the field.

In a real-life environment, the convolutional network of a system of the proposed infrastructure has been tested by means of a data set of 40000 samples of rendered 3D models. The models contained 310 unique and realistic poses of fallen people, which where applied to 1000 models of people with random gender, age, height, and size. The depth sensor 2 had a focal length of 580 pixels. 68% of the samples were used for training, 12% for validation, and 20% as a test set. The overall accuracy of bounding boxes BB computed by the system 8 in relation to the actual smallest cuboid exceeded 99% for occlusion ratios lower then 70% and above 97% for occlusion ratios up to 90%.

The invention is not restricted to these specific embodiments described in detail herein but encompasses all variants, variants, and modifications thereof that fall within the frame of the appended claims.

What is claimed is:

1. A method for determining a type and a state of an object of interest, comprising:
    generating a depth map of a scene by means of a depth sensor, the scene containing the object of interest and an occlusion object lying between the depth sensor and the object of interest such that, seen from the depth sensor, a first part of the object of interest is occluded and a second part of the object of interest is not occluded;
    from the depth map, computing three 2 dimensional (2D) occupancy views, each in a different viewing direction, and three 2 dimensional (2D) occlusion views, each in a direction corresponding to a different one of said viewing directions, wherein the occlusion views each depict the occlusion object and the occupancy views each depict the second part of the object of interest without said occlusion object;
    feeding each of said occupancy and occlusion views into a different input of a trained convolutional neural network;
    receiving both a class and a bounding box of the object of interest from the trained convolutional neural network; and
    determining the type of the object of interest from the received class, and the state of the object of interest from the bounding box.

2. The method according to claim 1, wherein the trained convolutional neural network comprises a frontend for generating feature maps from the occlusion and occupancy views, a middle section for generating class predictions and bounding box predictions from said feature maps, and an averaging section for generating the class and the bounding box by averaging the class predictions and bounding box predictions, respectively.

3. The method according to claim 2, wherein the frontend comprises three frontend groups of layers, one for each viewing direction, each group generating feature maps.

4. The method according to claim 3, wherein each frontend group consists of a first predetermined number of layers for the occupancy view and a second predetermined number of layers for the occlusion view, wherein the number of layers for the occupancy views is higher than the number of layers for the occlusion views.

5. The method according to claim 4, wherein the layers for the occupancy views consist of both convolutional layers and max-pooling layers and the layers for the occlusion views only consist of max-pooling layers.

6. The method according to claim 2, wherein the middle section comprises three middle section groups of layers, one for each viewing direction.

7. The method according to claim 6, wherein each middle section group comprises three dense layers, of which three dense layers a first-stage dense layer receives the feature maps from the frontend and of which three dense layers two parallel second-stage dense layers receive an output of the first-stage dense layers, wherein one of the second-stage dense layers outputs the class predictions and the other one of the second-stage dense layers outputs the bounding box predictions.

8. The method according to claim 1, wherein a fall of a person is detected when the type of the object of interest corresponds to a person and the state of the object of interest corresponds to a fall.

9. A system for determining a type and a state of an object of interest, comprising:
    a depth sensor configured to generate a depth map of a scene, the scene containing the object of interest and an occlusion object lying between the depth sensor and the object of interest such that a first part of the object of interest is occluded and a second part of the object of interest is not occluded;
    a processor configured to compute, from the depth map, three 2 dimensional (2D) occupancy views, each in a different viewing direction, and three 2 dimensional (2D) occlusion views, each in a direction corresponding to a different one of said viewing directions, wherein the occlusion views each depict the occlusion object and the occupancy views each depict the second part of the object of interest without said occlusion object;

a trained convolutional neural network having six inputs, the trained convolutional neural network being configured to receive each of said occupancy and occlusion views at a different input;

an evaluation device configured to receive both a class and a bounding box of the object of interest from the convolutional neural network, and to determine the type of the object of interest from the received class, and the state of the object of interest from the bounding box.

10. The system according to claim 9, wherein the trained convolutional neural network comprises a frontend configured to generate feature maps from the occlusion and occupancy views, a middle section configured to generate class predictions and bounding box predictions from said feature maps, and an averaging section configured to generate the class and the bounding box by averaging the class predictions and bounding box predictions, respectively.

11. The system according to claim 10, wherein the frontend comprises three frontend groups of layers, one for each viewing direction.

12. The system according to claim 11, wherein each frontend group consists of a first predetermined number of layers for the occupancy view and a second predetermined number of layers for the occlusion view, wherein the number of layers for the occupancy views is higher than the number of layers for the occlusion views.

13. The system according to claim 12, wherein the layers for the occupancy view consist of both convolutional layers and max-pooling layers and the layers for the occlusion view only consist of max-pooling layers.

14. The system according to claim 10, wherein the middle section comprises three identical middle section groups of layers, one for each viewing direction.

15. The system according to claim 14, wherein each middle section group comprises three dense layers, of which three dense layers a first-stage dense layer is configured to receive the feature maps from the frontend and two parallel second-stage dense layers are configured to receive an output of the first-stage dense layer, wherein one of the second-stage dense layers is configured to output the class predictions and the other one of the second-stage dense layers is configured to output the bounding box predictions.

16. The system according to claim 9, wherein the system is configured to detect a fall of a person when the type of the object of interest corresponds to a person and the state of the object of interest corresponds to a fall.

* * * * *

UNITED STATES PATENT AND TRADEMARK OFFICE
CERTIFICATE OF CORRECTION

| | |
|---|---|
| PATENT NO. | : 11,790,642 B2 |
| APPLICATION NO. | : 17/057459 |
| DATED | : October 17, 2023 |
| INVENTOR(S) | : Martin Kampel et al. |

It is certified that error appears in the above-identified patent and that said Letters Patent is hereby corrected as shown below:

In the Specification

Column 1, Line 3:
Should read: -- CROSS-REFERENCE TO RELATED APPLICATIONS
This application is a National Phase application of International Application No. PCT/EP2019/058660 filed April 5, 2019 which claims priority to European Patent Application No. 18 175 783.2 filed June 4, 2018, the disclosures of which are incorporated herein by reference.
TECHNICAL FIELD --

Column 1, Line 4:
Now reads: "The present invention relates"
Should read: -- The disclosed subject matter relates --

Column 1, Line 5:
Now reads: "The invention"
Should read: -- The disclosed subject matter --

Column 1, after Line 7:
Should read: -- BACKGROUND --

Column 1, after Line 49:
Should read: -- BRIEF SUMMARY --

Column 1, Line 50:
Now reads: "object of the invention"
Should read: -- object of the disclosed subject matter --

Column 1, Line 55:
Now reads: "aspect the invention"
Should read: -- aspect the disclosed subject matter --

Signed and Sealed this
Twenty-sixth Day of December, 2023

Katherine Kelly Vidal
*Director of the United States Patent and Trademark Office*

Column 2, Line 9:
Now reads: "The invention is based"
Should read: -- The disclosed subject matter is based --

Column 2, Line 33:
Now reads: "Preferably, the convolutional"
Should read: -- Optionally, the convolutional --

Column 2, Line 54:
Now reads: "Further preferably,"
Should read: -- Further optionally, --

Column 2, Line 64:
Now reads: "it is especially preferred"
Should read: -- it is especially advantageous --

Column 3, Line 12:
Now reads: "Further preferably, the layers"
Should read: -- In another embodiment, the layers --

Column 3, Line 30:
Now reads: "preferably also the middle"
Should read: -- optionally also the middle --

Column 3, Line 37:
Now reads: "Further preferably, in this embodiment"
Should read: -- In this embodiment --

Column 3, Line 38:
Now reads: "group comprises"
Should read: -- group optionally comprises --

Column 3, Line 60:
Now reads: "preferred when the"
Should read: -- advantageous when the --

Column 3, Line 65:
Now reads: "especially preferred as the fall"
Should read: -- especially suitable as the fall --

Column 4, Line 1:
Now reads: "aspect of the invention"
Should read: -- aspect of the disclosed subject matter --

CERTIFICATE OF CORRECTION (continued)
U.S. Pat. No. 11,790,642 B2

Column 4, Line 3:
Now reads: "and preferred embodiments"
Should read: -- and optional embodiments --

Column 4, after Line 4:
Should read: -- BRIEF DESCRIPTION OF THE DRAWINGS --

Column 4, Line 5:
Now reads: "The invention shall now"
Should read: -- The disclosed subject matter shall now --

Column 4, Line 6:
Now reads: "of preferred exemplary embodiments"
Should read: -- of exemplary embodiments --

Column 4, Line 9:
Now reads: "according to the present invention"
Should read: -- according to the disclosed subject matter --

Column 4, Line 16:
Now reads: "shows the inventive method in a flow"
Should read: -- shows a method according to the disclosed subject matter in a flow --

Column 4, after Line 18:
Should read: -- DETAILED DESCRIPTION --

Column 5, Line 41:
Now reads: "preferably without the object"
Should read: -- optionally without the object --

Column 7, Line 57:
Now reads: "The invention is not restricted"
Should read: -- The disclosed subject matter is not restricted --